US012780347B2

(12) United States Patent
Schedel et al.

(10) Patent No.: US 12,780,347 B2
(45) Date of Patent: Nov. 3, 2026

(54) HYDRAULIC BRAKE ARRANGEMENT FOR AN AT LEAST PARTIALLY MUSCLE-POWERED BICYCLE

(71) Applicant: TRICKSTUFF GMBH, Pfaffenweiler (DE)

(72) Inventors: Christoph Schedel, Freiburg (DE); Klaus Liedler, Sölden (DE)

(73) Assignee: TRICKSTUFF GMBH, Pfaffenweiler (DE)

(*) Notice: Subject to any disclaimer, the term of this patent is extended or adjusted under 35 U.S.C. 154(b) by 509 days.

(21) Appl. No.: 18/451,580

(22) Filed: Aug. 17, 2023

(65) Prior Publication Data

US 2024/0059370 A1 Feb. 22, 2024

(30) Foreign Application Priority Data

Aug. 22, 2022 (DE) ......................... 102022121163.0

(51) Int. Cl.

| | |
|---|---|
| ***B62L 3/02*** | (2006.01) |
| ***F15B 1/26*** | (2006.01) |
| ***F15B 21/00*** | (2006.01) |

(52) U.S. Cl.
CPC .............. *B62L 3/023* (2013.01); *F15B 1/265* (2013.01); *F15B 21/006* (2013.01)

(58) Field of Classification Search
CPC ........................................................ F15B 1/265
See application file for complete search history.

(56) References Cited

U.S. PATENT DOCUMENTS

| | | | | |
|---|---|---|---|---|
| 10,189,540 | B2 * | 1/2019 | Komada | B62M 25/08 |
| 10,232,905 | B2 | 3/2019 | Miki et al. | |
| 10,583,890 | B2 * | 3/2020 | Komada | B62L 3/023 |
| 10,589,819 | B2 | 3/2020 | Komada et al. | |
| 10,618,596 | B2 * | 4/2020 | Komada | B62K 23/06 |

(Continued)

FOREIGN PATENT DOCUMENTS

| | | | |
|---|---|---|---|
| DE | 102015003658 A1 | 9/2015 | |
| DE | 102015010839 A1 * | 8/2016 | B62M 25/08 |

(Continued)

OTHER PUBLICATIONS

DE 102015010839 A1 Machine Translation (No Date).*

(Continued)

*Primary Examiner* — Robert A. Siconolfi
*Assistant Examiner* — Shea Woodrow Irvin
(74) *Attorney, Agent, or Firm* — Greer, Burns & Crain, Ltd

(57) ABSTRACT

A hydraulic brake arrangement for a bicycle with a transmitting unit with a brake lever, and a cylinder housing with a cylinder space, and with a piston unit displaceably received in the cylinder space. In the tank space of an equalizing reservoir device, a membrane unit is disposed which subdivides the tank space into a fluid space for the hydraulic fluid and an air space sealed against the fluid space. The air space is connected with atmosphere through a vent opening. When the membrane unit is mounted, a filling mouth is in fluid connection with the fluid space. The vent opening opens into a receiving space that is at least partially enclosed by the base body of the transmitting unit. In the receiving space, an actuating mechanism is disposed which transmits force from the brake lever to the piston unit.

26 Claims, 6 Drawing Sheets

(56) References Cited

U.S. PATENT DOCUMENTS

| | | | | |
|---|---|---|---|---|
| 10,676,151 | B2 * | 6/2020 | Nakai | B62L 3/023 |
| 11,325,674 | B1 * | 5/2022 | Obuchi | B62K 23/06 |
| 2003/0121262 | A1 | 7/2003 | Lumpkin | |
| 2008/0060885 | A1 * | 3/2008 | Ruckh | B60T 11/22 188/26 |
| 2009/0120751 | A1 * | 5/2009 | Lin | B60T 11/22 188/344 |
| 2012/0152673 | A1 | 6/2012 | Wang | |
| 2019/0039679 | A1 * | 2/2019 | Nakai | B60T 11/18 |
| 2019/0061869 | A1 | 2/2019 | Komada et al. | |
| 2020/0198725 | A1 | 6/2020 | Komada et al. | |
| 2021/0364016 | A1 | 11/2021 | Nishikawa | |

FOREIGN PATENT DOCUMENTS

| | | | |
|---|---|---|---|
| DE | 202017001935 | U1 | 10/2017 |
| DE | 102020128142 | A1 | 4/2022 |
| WO | 99/10225 | A2 | 3/1999 |

OTHER PUBLICATIONS

Search Report received for German Application No. 102022121163.0, dated May 8, 2023.

Communication received for European Application No. 23192429.1, dated Feb. 2, 2024.

* cited by examiner

HYDRAULIC BRAKE ARRANGEMENT FOR AN AT LEAST PARTIALLY MUSCLE-POWERED BICYCLE

BACKGROUND

The present invention relates to a hydraulic brake arrangement for an at least partially muscle-powered bicycle and comprises at least one transmitting unit, wherein a fluid connection can be established with a receiving unit. The transmitting unit comprises a brake lever and a cylinder housing with a cylinder space, and a piston unit displaceably accommodated in the cylinder space and at least one equalizing reservoir device for a hydraulic fluid.

Hydraulic disk brakes for bicycles offer safe braking, including in fast rides and for example in sports cycling, for racing bicycles or mountain bikes. Moreover, safe braking is also provided for electric bicycles or city bikes.

Due to the hydraulic actuation, however, maintenance of these brakes calls for increased requirements. This relates e.g. to filling up the hydraulic fluid and deaerating the closed hydraulic circuit. Moreover, for reliable operation it must be ensured that both during operation and in maintenance work, no dirt can enter in the hydraulic circuit.

In hydraulic bicycle brakes, the hydraulic fluid is as a rule located in the tank bottom. Above, there is air. Thus, as the oil level sinks, a vacuum may show respectively as the oil level rises, excess pressure may show in the tank. To prevent this, a vent hole is as a rule provided which is in fluid connection with atmosphere.

To prevent the hydraulic fluid from escaping through the vent hole (e.g. in a fall), a membrane is disposed in the tank space, separating the tank space to a fluid space and an air space. Deformation of the membrane adapts the fluid space volume to the oil level given at the time. The vent hole prevents any vacuum or excess pressure in the air space.

Usually, both the filling mouth for the hydraulic fluid and the air space are disposed above the membrane, while the fluid space is located beneath the membrane. Thus, the filling mouth opens into the air space when the membrane is mounted. The hydraulic fluid is "shielded" from the filling mouth by means of the membrane. For filling the hydraulic fluid into the fluid space through the filling mouth, the membrane must first be demounted as a rule. After filling the hydraulic fluid in, the membrane must be mounted again.

DE 10 2017 208 483 A1 describes a racing bicycle shifting and braking fitting for a hydraulic racing bicycle, with the air space disposed beneath the membrane. Both the filling mouth and the fluid space are disposed above the membrane. Thus, the hydraulic fluid can be filled into the fluid space through the filling mouth without demounting the membrane.

In view of this, it is the object of the present invention to provide an improved hydraulic brake arrangement. In particular, is the brake arrangement intended to provide particular ease of servicing, which even inexperienced users can readily carry out, without having to demount the membrane. At the same time, the brake arrangement must also offer reliable operation and safe braking action even in difficult conditions, for example in a dirty or abrasive environment (sand, salt) or when installed in mountain bikes.

Summary

The hydraulic brake arrangement according to the invention is provided for an at least partially muscle-powered bicycle. The brake arrangement comprises at least one transmitting unit provided for fluid connection with a receiving unit. The brake arrangement may comprise at least one receiving unit. The transmitting unit comprises a brake lever and a cylinder housing with a cylinder space. The transmitting unit comprises a piston unit displaceably accommodated in the cylinder space. The transmitting unit comprises at least one equalizing reservoir device for a hydraulic fluid. The equalizing reservoir device comprises a tank space and at least one filling mouth for filling the hydraulic fluid into the tank space. At least one (flexible and/or elastic) membrane unit is disposed in the tank space. The membrane unit subdivides the tank space into a fluid space for the hydraulic fluid and an air space sealed (fluid-tight) against the fluid space. At least one duct connection is configured between the fluid space and the cylinder space. In particular, the cylinder space and the fluid space are in fluid connection through the duct connection. The air space is connected with atmosphere through at least one vent opening, so as to enable pressure compensation between the air space and atmosphere. The filling mouth is (when the membrane unit is installed as intended) in fluid connection with the fluid space. The filling mouth, in particular, opens into the fluid space. The filling mouth and the vent opening are, in particular, disposed on opposite sides of the membrane unit. The filling mouth is, in particular, separated (fluid-tight) from the vent opening by means of the membrane unit. The vent opening, in particular, opens into a receiving space. The receiving space is, in particular, at least partially encircled by a base body of the transmitting unit. An actuating mechanism is at least partially disposed, in particular, in the receiving space. The actuating mechanism, in particular, enables force transmission from the brake lever to the piston unit. The vent opening may also exit laterally from the base body and, in particular, from the equalizing reservoir device. Then, the vent opening, in particular, opens into the environment of the transmitting unit above the receiving space.

The brake arrangement according to the invention offers many advantages. A significant advantage is offered by the aeration opening leading into the vent opening. Thus, contamination of the membrane unit and the air space is reliably counteracted. Otherwise, dirt might enter through the vent opening, e.g. reaching the membrane unit and then, during servicing (e.g. as the membrane unit is shifted or removed), it might enter further into the hydraulic circuit. Moreover, such a configuration of the vent opening has shown to be of particular advantage when cleaning a bicycle for example by means of a high pressure cleaner. Otherwise, considerable quantities of water and dirt might enter, so that the membrane unit might be damaged immediately or in the long run. Its arrangement in the receiving space prevents the high pressure jet from being directed immediately toward the vent opening. At the same time, the invention allows particular ease of filling up the hydraulic circuit without having to demount the membrane unit. This again prevents dirt from entering. Moreover, the membrane unit and the hydraulic circuit are on the whole accommodated safely, including in difficult conditions (servicing in the field, use in dirty or dusty environment).

Preferably, the vent opening is configured duct-like. Preferably, the vent opening is configured as a vent hole or it comprises at least one (and, in particular, exactly one) vent hole. The vent opening is preferably configured rotationally symmetrical at least in sections, and it may partially or entirely be configured cylindrical. In particular, may the vent opening have a shape as it is generated by using a drill or milling cutter. Other geometries are likewise possible. In all the configurations, specific embodiments and embodiments, the term “vent opening” may, in particular, be more precisely defined by the term “vent hole”.

The base body is preferably configured integrally. In particular, is the cylinder housing an integral part of the base body. In particular, is the cylinder housing integrally connected with the base body. Preferably, the cylinder space is incorporated in the base body. In particular, is the cylinder space provided by a recess in the base body. In particular, is the base body cut out of one piece of material. Alternately, the base body may be cast in one piece.

In particular, is the vent opening at least partially, and preferably entirely, disposed in the base body. In such a configuration, the mouth of the vent opening into the receiving space offers particularly many advantages. Moreover, the components of the hydraulic circuit are particularly safely accommodated in this way, protected from dirt and shocks. Moreover, such a base body allows a structurally uncomplicated architecture of the brake arrangement including a particularly small number of component parts. This results, in particular, reliability and robustness of operation, and ease of maintenance.

In particular, is the receiving space configured in the base body. In particular, is the receiving space an integral component of the base body. Preferably, the receiving space is incorporated in the base body. In particular, is the receiving space provided by a recess in the base body. The base body, in particular, encircles the receiving space on at least two sides, and preferably on at least three sides, at least partially. In particular, is the receiving space enclosed by the base body on at least two and preferably at least three sides, at least in sections.

In an advantageous specific embodiment, an imaginary elongation of the longitudinal axis of the vent opening intersects the actuating mechanism. The actuating mechanism comprises, in particular, at least one connecting rod device with a connecting rod and a connecting rod small end. In particular, is the connecting rod small end firmly connected with the connecting rod. In particular, is the connecting rod device configured as one piece. In particular, is the piston unit operatively coupled with the brake lever through the actuating mechanism, such that the piston unit is displaced in the cylinder space as the transmitting unit is actuated.

The imaginary elongation preferably intersects the connecting rod device and, in particular, its connecting rod. The connecting rod device, in particular, extends from the receiving space through a connecting opening of the cylinder housing into the cylinder space. The connecting opening is, in particular, configured in a supporting wall. The vent opening opens into the receiving space, in particular, above the connecting rod device.

Preferably, the receiving space accommodates, at least partially, at least one cam body of the actuating mechanism. A connecting rod device and preferably its connecting rod is, in particular, pivotally linked to the cam body. It is preferred for the vent opening to open into the receiving space between the cam body and a supporting wall. The supporting wall, in particular, comprises a connecting opening through which the actuating mechanism (in particular, the connecting rod device) extends from the receiving space into the cylinder space to the piston unit. This offers a particularly advantageous accommodation of the vent opening in the receiving space. An imaginary elongation of the longitudinal axis of the vent opening extends, in particular, between the supporting wall and the cam body.

The connecting rod device is preferably linked to the cam body for pivoting around a connecting rod pivot axis. It is preferred and advantageous for the connecting rod pivot axis and a longitudinal axis of the vent opening to extend in one shared plane and preferably in parallel. When the brake lever is in a rest position, and/or when the connecting rod device with its connecting rod small end rests against the supporting wall (inside the cylinder space), then the connecting rod pivot axis and the longitudinal axis of the vent opening and the longitudinal axis of the cylinder space preferably extend in one shared plane. In the scope of the present invention, a rest position is, in particular, understood to mean that the transmitting unit respectively the brake lever are not actuated. This offers a particularly compact while protected accommodation of the vent opening and the actuating mechanism in the receiving space. When the brake lever is actuated, the connecting rod pivot axis, in particular, pivots out of a plane in which extend the longitudinal axis of the vent opening and the longitudinal axis of the cylinder space.

In particular, is the brake lever linked to a lever accommodation for pivoting around a brake lever pivot axis. The vent opening preferably has a longitudinal axis extending in one plane shared with the brake lever pivot axis and, in particular, parallel to the brake lever pivot axis. The lever accommodation is preferably an integral component of the base body and is, in particular, integrally connected with the base body. The brake lever is, in particular, pivotally supported on the base body. The brake lever pivot axis preferably extends through the receiving space. Thus, the brake lever respectively the actuating mechanism contribute to protecting the vent opening. It is also possible for the brake lever pivot axis to laterally limit the receiving space. A cam pivot axis extends, in particular, through the receiving space. The connecting rod pivot axis, in particular, extends through the receiving space.

In an advantageous configuration, the vent opening and the duct connection comprise longitudinal axes extending in one shared plane and preferably in parallel. Such a configuration relates, in particular, to a longitudinal axis of at least one equalizing hole and/or at least one lubrication hole and/or a central duct of the duct connection. This allows a particularly uncomplicated manufacture of the vent opening and for example together with the duct connection. The configurations described above offer a particularly advantageous, structural basis for such an arrangement of the vent opening.

In a particularly advantageous and preferred specific embodiment, an imaginary axial elongation of the cylinder space extends through the receiving space. An imaginary elongation of the longitudinal axis of the cylinder space extends, in particular, through the receiving space. An imaginary elongation of the longitudinal axis of the cylinder space intersects, in particular, an imaginary elongation of the longitudinal axis of the vent opening.

It is preferred and advantageous for the equalizing reservoir device (in particular, at least the tank trough and/or the cover and/or the membrane unit) to be disposed above the cylinder space and the receiving space. Preferably, the equalizing reservoir device and the cylinder space and/or the receiving space have longitudinal axes extending in one shared plane and preferably in parallel. Such a structural architecture offers many advantages. The equalizing reservoir device is, in particular, configured elongated.

Preferably, the equalizing reservoir device bridges the cylinder housing and the receiving space, at least in sections. The bottom of the tank trough, in particular, forms a cover (i.e. the upper wall) of the cylinder housing and the receiving space.

The filling mouth is preferably also configured as a deaeration opening for deaerating a hydraulic circuit. Preferably, deaeration is possible with a membrane unit installed as intended. Deaeration is, in particular, possible without removing the membrane unit. The transmitting unit, the receiving unit and the conduction device, in particular, provide a closed hydraulic circuit. In the scope of deaeration, the filling mouth is, in particular, suitable and configured to carry off air from the hydraulic circuit into the environment. Thus, even inexperienced users can readily fill up and deaerate the brake arrangement. Moreover, no additional bores or holes in the transmitting unit are required.

Preferably, the air space is disposed beneath the membrane unit. Preferably, the fluid space is disposed above the membrane unit. These arrangements are, in particular, given when the transmitting unit is mounted to a handlebar as intended. The air space is, in particular, located between the membrane unit and the receiving space. The receiving space is, in particular, located beneath the equalizing reservoir device. The cylinder space is, in particular, at least partially, located beneath the equalizing reservoir device. The membrane unit and the tank space extend, in particular, only over part of the radial circumference of the cylinder housing.

The equalizing reservoir device (in particular, the tank space), in particular, shows a longitudinal axis which is inclined (oblique) to the horizontal when the transmitting unit is mounted to a handlebar as intended. Preferably, the equalizing reservoir device has at least one collecting area for the air, disposed higher than are the remaining areas of the equalizing reservoir device, when the transmitting unit is mounted to a handlebar as intended. The filling mouth is preferably disposed on the collecting area and, in particular, above the collecting area of the equalizing reservoir device. Preferably, an end portion of the equalizing reservoir device is located higher than is an end portion of the equalizing reservoir device lying opposite in the longitudinal direction, when the transmitting unit is mounted to a handlebar as intended. Then, the filling mouth is preferably disposed on the end portion of the equalizing reservoir device lying higher. This allows even more ease and reliability of deaerating the brake arrangement. The brake arrangement may comprise at least one handlebar where the transmitting unit can be mounted. The brake arrangement may comprise a bicycle with such a handlebar.

In particular, is the end portion of the equalizing reservoir device which is located higher, closer to the brake lever than is the end portion located lower, when the transmitting unit is mounted to a handlebar as intended. Then, the end portion of the equalizing reservoir device located lower, is, in particular, closer to a connection port respectively a receiving end of the transmitting unit, than is the end portion of the equalizing reservoir device located higher. The brake lever, in particular, forms the highest point of the transmitting unit when the transmitting unit is mounted to a handlebar as intended. The brake lever pivot axis is, in particular, also positioned inclined to the horizontal respectively to the longitudinal axis of the handlebar, when the transmitting unit is mounted to a handlebar as intended.

The transmitting unit may comprise a handlebar link, which is configured such that the transmitting unit can (only) be mounted to a handlebar such that the longitudinal axis of the equalizing reservoir device is inclined to the longitudinal axis of the handlebar (as described above). It is also possible for the handlebar to show a cranked portion (so-called upsweep), to which the transmitting unit can be fastened by means of the handlebar link. The cranked portion then inclines the transmitting unit to the horizontal.

Preferably, the duct connection and the filling mouth are disposed to end portions of the equalizing reservoir device which are opposite each other in the longitudinal direction. The duct connection is, in particular, disposed on the end portion of the equalizing reservoir device located lower. This causes further improvement to deaerating.

Preferably, the vent opening and the filling mouth have longitudinal axes extending in a shared plane and preferably in parallel. The vent opening and the filling mouth, in particular, do not have a shared longitudinal axis. Alternately it is possible for the vent opening and the filling mouth to have a shared longitudinal axis.

The equalizing reservoir device preferably comprises at least one tank trough and at least one cover. The tank trough and the cover are, in particular, mounted to one another, sealed by means of at least one tank sealing. The tank sealing is an integral component of the membrane unit. Thus, the quantity of components is reduced and mounting is simplified. The membrane unit, in particular, comprises at least one tank sealing. The tank sealing is, in particular, integrally connected with the membrane unit. The membrane unit is, in particular, configured as one piece. The tank sealing is, in particular, disposed at least partially circumferential around a membrane component.

The tank space is, in particular, limited by the tank trough and the cover. The tank trough is, in particular, an integral component of the base body. The tank trough is, in particular, integrally connected with the base body. The cover is, in particular, a separate part. The tank trough is, in particular, provided by a recess in the base body. The tank trough may be manufactured by material removal from the base body.

In an advantageous configuration, the vent opening is configured in the bottom in the tank trough. The filling mouth is, in particular, configured in the cover. The bottom of the tank trough, in particular, also forms a cover (i.e., a top wall) of the receiving space and/or the cylinder space. This offers ease of manufacturing a particularly compact transmitting unit.

It is possible and preferred for the tank trough and/or the cover to provide at least one receiving groove for the tank sealing. In particular, the tank trough and the cover are spaced apart in the region of the receiving groove when mounted as intended, such that the tank sealing is accommodated shear-proof. In this way, the tank sealing, for example in the case of an accident involving a shock acting on the cover, cannot be jammed and sheared off. The cover and the tank trough, in particular, outside of the receiving groove, are in contact, with one another at least in sections. The cover is, in particular, fastened and preferably screwed to the tank trough.

In an advantageous specific embodiment the membrane unit comprises a membrane component that can be spread between the fluid space and the air space. The membrane component is, in particular, an integral component of the membrane unit. The membrane component is, in particular, integrally connected with the membrane unit. Preferably, the membrane unit comprises at least one arcuate connection member. The connection member, in particular, biases the membrane component, at least in sections, against the bottom of the equalizing reservoir device.

The membrane component is, in particular, connected with the tank sealing through the connection member. The connection member extends, in particular, between the tank sealing and the membrane component. The connection member is, in particular, also an integral component of the membrane unit. The connection member, in particular, enables movement of the membrane component relative to the tank sealing.

Preferably, the membrane component is configured convex above the vent opening. Thus, the membrane component is, in particular, disposed spaced apart from the bottom of the equalizing reservoir device, at least where it is convex.

Preferably, the membrane unit provides at least one trough space which is encircled by a trough bottom and side walls extending transverse to the trough bottom. The fluid space is, in particular, disposed in the trough space. The air space and the vent opening are, in particular, disposed on a side of the trough space facing away from the fluid space (in particular, beneath the trough bottom). The trough space is, in particular, configured open (on top) and there it is preferably closed by the cover (and, in particular, by the tank trough as well).

The membrane component is, in particular, configured trough-like. The membrane component, in particular, comprises at least one membrane trough. In the mounted state as intended, the membrane trough extends, in particular, into the tank trough. Preferably, the membrane trough protrudes out of the tank trough. The membrane trough, in particular, protrudes beyond the tank sealing. The bottom of the membrane trough is, in particular, convex. The bottom edge of the membrane trough in particular rests against the bottom of the equalizing reservoir device. The connection member, in particular, biases the bottom edge of the membrane trough against the bottom of the equalizing reservoir device. The membrane trough is, in particular, configured pre-shaped.

Preferably, the duct connection extends from the fluid space through the cover of the equalizing reservoir device and through the base body to the cylinder space. It is preferably provided for the cover and the base body to be mounted to one another circumferentially around the duct connection, sealed by means of a duct sealing. The duct sealing is, in particular, an integral component of the membrane unit. The duct sealing is, in particular, integrally connected with the membrane unit. The duct connection extends, in particular, at least in sections, inside the cover and inside of the base body. The duct connection extends, in particular, through that part of the base body which provides the cylinder housing, and, in particular, also through a part of the base body which is disposed above the cylinder housing and laterally adjacent to the tank trough.

The cover and/or the tank trough, in particular, provide at least one receiving groove for the duct sealing, such that the duct sealing is accommodated shear-proof. This receiving groove is, in particular, configured in analogy to the above-described receiving groove for the tank sealing.

Preferably, the duct sealing encircles the duct connection annularly. Preferably, the duct sealing extends in sections between the cover and a tank trough of the equalizing reservoir device. The duct sealing is, in particular, suitable and configured to prevent air from the air space from entering into the duct connection (between the cover and tank trough). The duct sealing is, in particular, configured in a ring shape. The duct sealing, in particular, encloses a (central) through hole. The duct sealing and the tank sealing, in particular, extend immediately adjacent to one another, in sections. In these regions, the duct sealing, in particular, also seals the tank space from the duct connection.

Preferably, the tank sealing encircles the membrane component in a ring shape. This ensures a reliable sealing of the tank space against the outside, and at the same time, a reliable sealing of the air space against the fluid space. Preferably, the duct sealing is disposed outside of the membrane component. This offers many structural advantages and enables for example a particularly compact design of the transmitting unit. Moreover, particularly high degrees of freedom ensue for the arrangement of the duct connection, which in turn can be utilized for a particularly compact and lightweight layout of the transmitting unit. The tank sealing is, in particular, disposed between the cover and the tank trough along its entire circumference.

The duct sealing is, in particular, not encircled by the tank sealing in a ring shape. The duct sealing is, in particular, located outside of the tank sealing, at least in sections. The duct sealing is, in particular, located laterally adjacent to the membrane component and in particular, at least in sections, laterally adjacent to the tank sealing. The tank sealing extends, in particular, in sections, between the duct sealing and the membrane component.

An advantageous specific embodiment provides for the hydraulic fluid to have to pass the membrane unit to get (from the tank space) to the cylinder space. To this end, the hydraulic fluid preferably passes through the membrane unit through a through hole enclosed by the duct sealing. Preferably, the hydraulic fluid must flow through the through hole in the membrane unit, to get from the fluid space via the duct connection to the cylinder space.

Particularly preferably, the membrane unit is configured integrally. In particular, the membrane component and the connection member and the tank sealing and the duct sealing are integrally interconnected. The membrane unit is, in particular, configured flexible and preferably elastic. The applicant retains the right to seek protection for a membrane unit, in particular, for use with a brake arrangement, which subdivides the tank space into a fluid space for the hydraulic fluid and an air space sealed (fluid-tight) against the fluid space. Preferably, the membrane component and the connection member and the tank sealing and the duct sealing are integrally interconnected in the membrane unit. Preferably, the claimed membrane unit is configured as described herein.

The duct connection, in particular, comprises a longitudinal axis, which extends transverse to a shared longitudinal axis of the equalizing reservoir device and the cylinder space and the receiving space.

The duct connection, in particular, comprises at least one equalizing hole. The equalizing hole may also be referred to as snifter hole. The equalizing hole is, in particular, understood to mean a channel-type through hole, which does not need to be manufactured by boring or drilling. The duct connection, in particular, comprises at least one lubrication hole. The duct connection comprises, in particular, a central duct, which is subdivided in the at least one equalizing hole and the at least one lubrication hole. The central duct, in particular, shows a larger cross section than the equalizing hole and/or the lubrication hole. The central duct is, in particular, configured as a blind hole bore in the base body. The equalizing hole and the lubrication hole, in particular, begin in the bottom of the central duct from where they extend into the cylinder space. The duct connection is, in particular, formed by at least one hole and preferably a number of holes in the base body and/or in the cover.

Preferably, the central duct and at least one of the at least one equalizing holes and at least one of the at least one lubrication holes show longitudinal axes extending in a shared plane and preferably in parallel. In the case of two or more equalizing holes (or lubrication holes), this indicates, in particular, an imaginary longitudinal axis in the center of the holes or the longitudinal axis of a central hole. The vent opening extends, in particular, non-orthogonal to the at least one equalizing hole and/or to the at least one lubrication hole.

The duct connection comprises, in particular, at least one transverse duct connecting the central duct with the fluid space. The transverse duct is, in particular, configured in the cover.

A part of the central duct, in particular, extends in the cover, and another part of the central duct, in the base body. The duct sealing extends, in particular, between the two parts of the central duct.

The piston unit and the cylinder housing, in particular, limit a pressure space (provided for fluid connection with the receiving unit). The pressure space represents, in particular, a part of the cylinder space. The at least one equalizing hole is disposed in the cylinder housing (in particular, in a cylinder wall of the cylinder housing). The at least one equalizing hole connects the pressure space with the fluid space (when the piston unit is in a rest position respectively when the transmitting unit is not actuated). In the case of actuation of the transmitting unit, the piston unit seals the pressure space, in particular, against the fluid space, such that pressure can be applied on the pressure space. In other words, actuating the transmitting unit allows the piston unit to close the equalizing hole. A subsequent further movement of the piston unit results, in particular, in a pressure buildup in the pressure space and in reduction of the pressure space volume. The transmitting unit is, in particular, actuated by (manually) moving respectively actuating the brake lever.

The at least one lubrication hole, in particular, connects with the fluid space, a part of the cylinder space lying outside of the pressure space. The lubrication hole is, in particular, disposed between the equalizing hole and a lever-side end of the cylinder housing. The lubrication hole, in particular, feeds hydraulic fluid from the tank space to lubricate the piston unit. Moreover, the lubrication hole, in particular, carries off into the tank space any hydraulic fluid leaking behind a primary seal of the piston unit sealing device.

The cylinder housing comprises, in particular, on a receiving end, a connection port for linking a conduction device. The hydraulic fluid in the pressure space communicates, in particular, through the connection port with the hydraulic fluid in the conduction device respectively the receiving unit. The connection port and the connecting opening lie, in particular, on the longitudinal axis of the cylinder space. The connection port and the connecting opening are, in particular, disposed on opposite ends of the cylinder housing.

In the scope of the present invention, particulars on relative positioning of components, in particular, relate to a mounting position as intended of the brake arrangement, and, in particular, to a transmitting unit mounted to a handlebar as intended. The term “fluid-tight”, in particular, relates to the hydraulic fluid employed, under pressure conditions provided for operation.

The filling mouth is, in particular, sealed against the air space by means of the membrane unit. The vent opening is, in particular, disposed beneath the membrane unit. The hydraulic fluid rests, in particular, on the membrane unit. The hydraulic fluid, in particular, does not rest on the tank trough bottom. The fluid space is, in particular, located on a higher level than the air space. The fluid space is, in particular, located above the air space. The air space is, in particular, located beneath the fluid space.

The equalizing reservoir device is, in particular, at least partially (in particular, its tank trough) an integral component of the base body. The lever accommodation is, in particular, an integral component of the base body. In particular, at least one section of the handlebar link (in particular, at least one of the at least two linking sections) is an integral component of the base body.

The base body, in particular, comprises at least the cylinder housing, the receiving space (or a receiving space housing), the tank trough, the lever accommodation and/or at least one part of the handlebar link. In particular, the components indicated above are integrally interconnected. In particular, the cylinder housing and at least in sections, the equalizing reservoir device, and at least in sections, the handlebar link and the lever accommodation, are integrally interconnected. These components, in particular, provide the base body, or they are at least parts of the base body. In particular, the base body may comprise further components which are integrally configured therewith.

In particular, the tank space is at least in sections (in particular, its tank trough) configured, and preferably incorporated, in the base body. The tank space is, in particular, provided by a recess in the base body, at least in sections. Particularly preferably, the receiving space and the cylinder space (and, in particular, at least sections of the tank space as well) are manufactured by way of material removal from the base body. The receiving space is, in particular, enclosed by a receiving space housing. The receiving space housing is preferably an integral component of the base body. The receiving space housing is preferably integrally connected with the base body.

The equalizing hole may comprise, or be provided by, one or more single holes. The equalizing hole discussed in the scope of the present invention, in particular, relates to all the single holes. This applies in analogy, in particular, also to a lubrication hole. The vent opening may also consist of at least two or more single holes. Alternately, the vent opening may comprise one hole only. In the scope of the present invention, a hole may be manufactured by means of boring or other suitable processes, and for example by milling or the like. In the scope of the present invention, a hole is, in particular, understood to mean at least one elongated (channel-type) (through) hole.

The receiving space, in particular, has access to atmosphere. The receiving space is, in particular, not sealed against atmosphere. The receiving space is, in particular, configured partially open. The receiving space comprises, in particular, at least one opening through which the cam body extends toward the brake lever and/or through which the brake lever extends toward the cam body. The receiving space, in particular, does not have a bottom or is provided with an opening in the bottom. The receiving space may comprise a closed bottom.

The cam body is, in particular, pivotally linked to a lever accommodation by means of a cam pivot axle. In particular, the connecting rod device and the cam body are pivotable relative to one another. The brake lever pivot axis and the cam pivot axis are, in particular, identical. The brake lever and the cam body, in particular, have one shared point of support on the lever accommodation. The connecting rod pivot axis, in particular, extends through the cam body.

It is possible and advantageous for the cam body and the brake lever to be fixedly interconnected. Then, the cam body and the brake lever can, in particular, only be moved jointly. For example, the cam body and the brake lever may be integrally interconnected. The cam body and the brake lever may be configured as separate components. It is also possible and advantageous for the cam body and the brake lever to be movable relative to one another. Preferably, the cam body and the brake lever can then be pivoted around one shared pivot axis independently of one another.

The transmitting unit can, in particular, be mounted to the handlebar of a bicycle. The brake arrangement comprises, in particular, at least one handlebar link for mounting the transmitting unit to a handlebar. The handlebar link is, in particular, integrally connected with the base body, at least in sections. The handlebar link comprises, in particular, at least two linking sections, which encircle at least part of the handlebar. In particular, at least a first of the at least two linking sections is integrally connected with the base body. At least one second of the at least two linking sections is, in particular, configured separate from the base body and can preferably be removably fastened to the base body (e.g. by screwing). Alternately, the handlebar link may be configured for mounting the transmitting unit directly on the handlebar (e.g. by screws or receivers/flanges laminated to the handlebar).

The piston unit comprises, in particular, a piston (respectively piston body) and at least one piston sealing device. The piston is, in particular, configured integrally. Alternately, the piston may be structured multipart. In the scope of the present invention, the term "piston unit" is, in particular, used to mean the piston and the piston sealing device mounted thereto.

The piston sealing device comprises in particular at least one (first) piston sealing disposed circumferentially around the piston. The piston sealing, in particular, seals the piston against the cylinder housing. The piston sealing, in particular, seals the pressure space against the equalizing hole (when the piston unit is displaced in the cylinder space due to actuation). The piston sealing may also be referred to as a primary sealing.

The piston sealing device, in particular, comprises at least one further piston sealing. The further piston sealing may be referred to as a secondary sealing. The further piston sealing is, in particular, located outside of the pressure space. The further piston sealing is, in particular, spaced apart from the primary sealing. The further piston sealing is, in particular, located between the primary sealing and an end of the piston facing the supporting wall. The further piston sealing, in particular, seals the tank space against the connecting opening and preferably against the receiving space.

It is advantageous that bubbles, if any, can virtually always float upwardly. In all the configurations it is particularly preferred that in the mounted (and operational) state the filling mouth 25 is (as a rule) disposed in the highest point of the fluid space 35 (of the transmitting unit 10), when the transmitting unit 10 is mounted to a handlebar 101. This reliably guides air bubbles outwardly.

The vent opening, in particular, comprises at least two mouths. A first mouth opens into the receiving space. A second mouth opens into the air space. The second mouth is, in particular, located lower than is the first mouth. The second mouth is, in particular, located beneath the first mouth. Liquids and/or dirt can, in particular, drain out of the vent opening into the receiving space, due to gravity. The vent opening, in particular, extends (in respect of its longitudinal axis) transverse to the longitudinal axis of the cylinder space and/or transverse to the longitudinal axis of a handlebar (when the transmitting unit is mounted to a handlebar as intended). The vent opening, in particular, extends (in respect of its longitudinal axis) inclined to the horizontal (when the transmitting unit is mounted to a handlebar as intended). The vent opening, in particular, forms a duct between the mouths. The duct is, in particular, encircled by the material of the base body. The vent opening is, in particular, configured in the tank trough of the equalizing reservoir device. The cylinder housing is preferably integrally connected with the tank trough of the equalizing reservoir device.

The connection port is preferably provided with at least one chamfer. Preferably, the chamfer is suitable and configured to protect, and, in particular, compress when pushing the piston unit into the connection port, a piston sealing device mounted to the piston. In particular, is the chamfer disposed on a receiver-side end of the cylinder space. For example, the chamfer is located on the receiver-side end of a raceway for the piston unit (so-called cylinder raceway). The chamfer is, in particular, disposed in a transition from a first to a second diameter of the connection port, wherein the first diameter is smaller than the second diameter. In particular, is the first diameter the minimum diameter of the connection port, and preferably corresponds to the diameter of the cylinder space. In particular, is the chamfer configured integrally with the cylinder housing.

Further advantages and features of the present invention can be taken from the exemplary embodiments which will be described below with reference to the enclosed figures.

DETAILED DESCRIPTION

Figure 1:
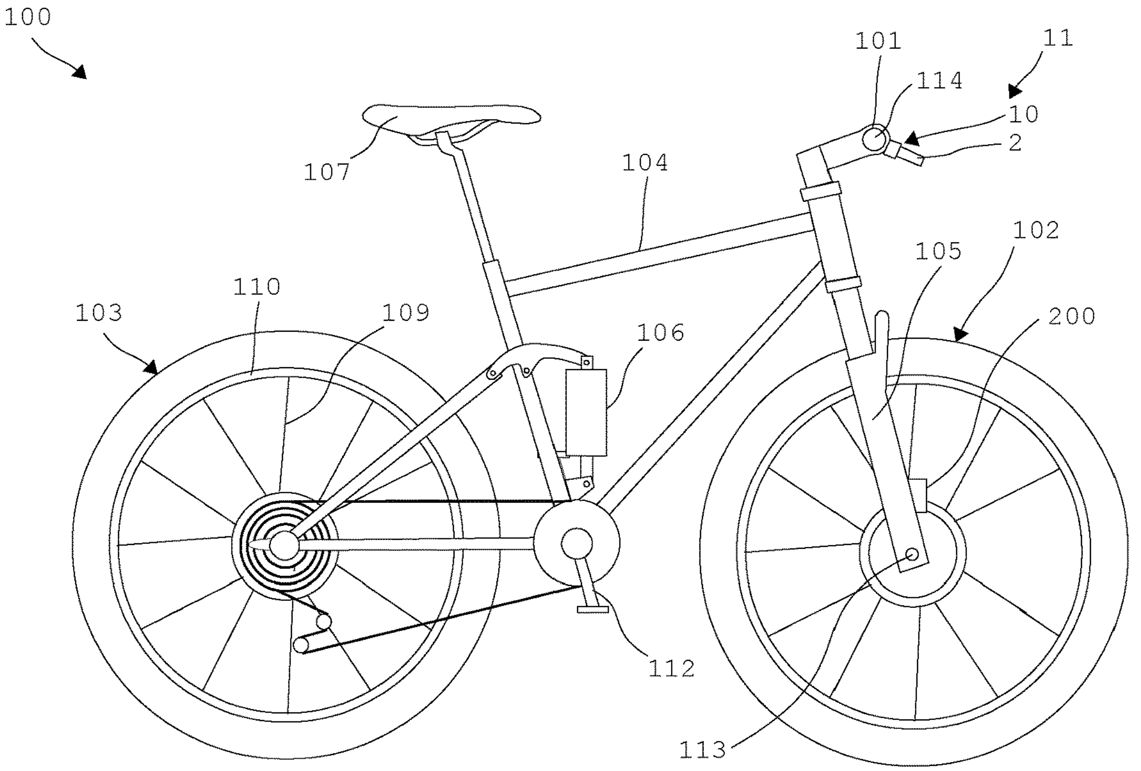
FIG. 1 a schematic illustration of a mountain bike with a brake arrangement according to the application.
Figure 2:
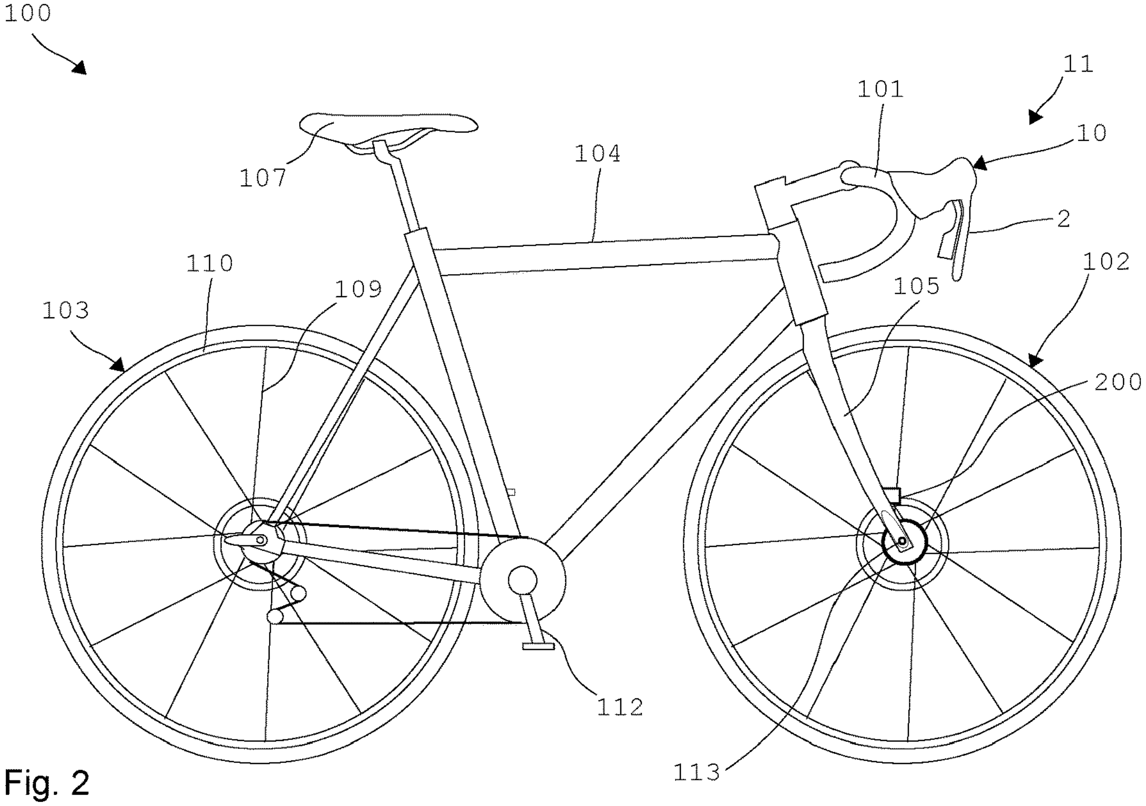
FIG. 2 a schematic illustration of a racing bicycle with a brake arrangement according to the application.
Figure 3:
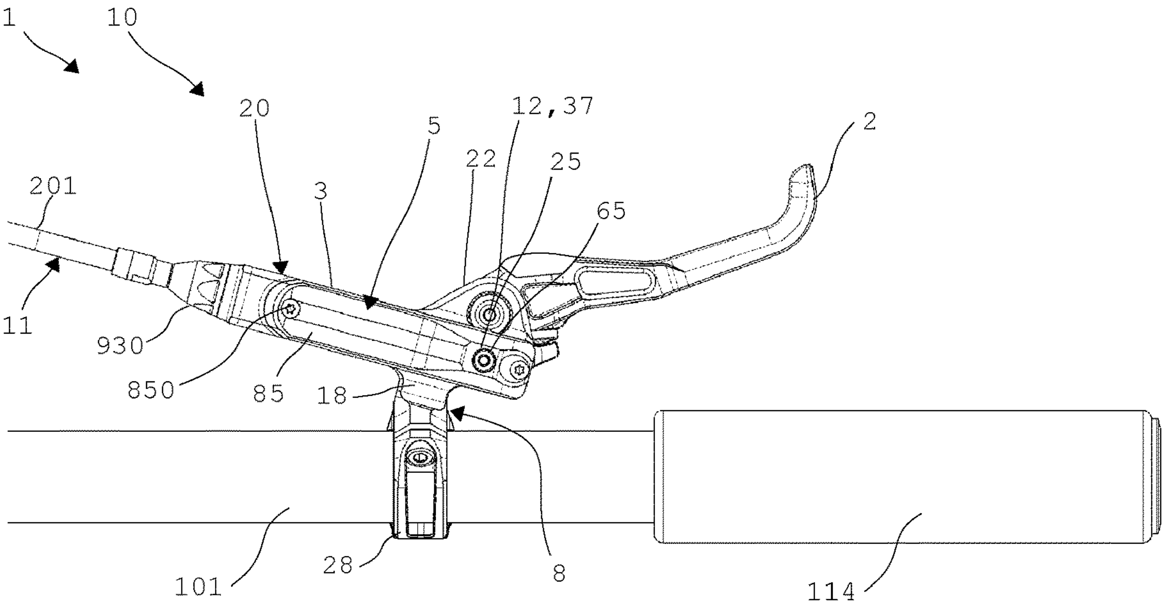
FIG. 3 a schematic illustration of a brake arrangement according to the application on the handlebar of a bicycle in a top view.
Figure 4:
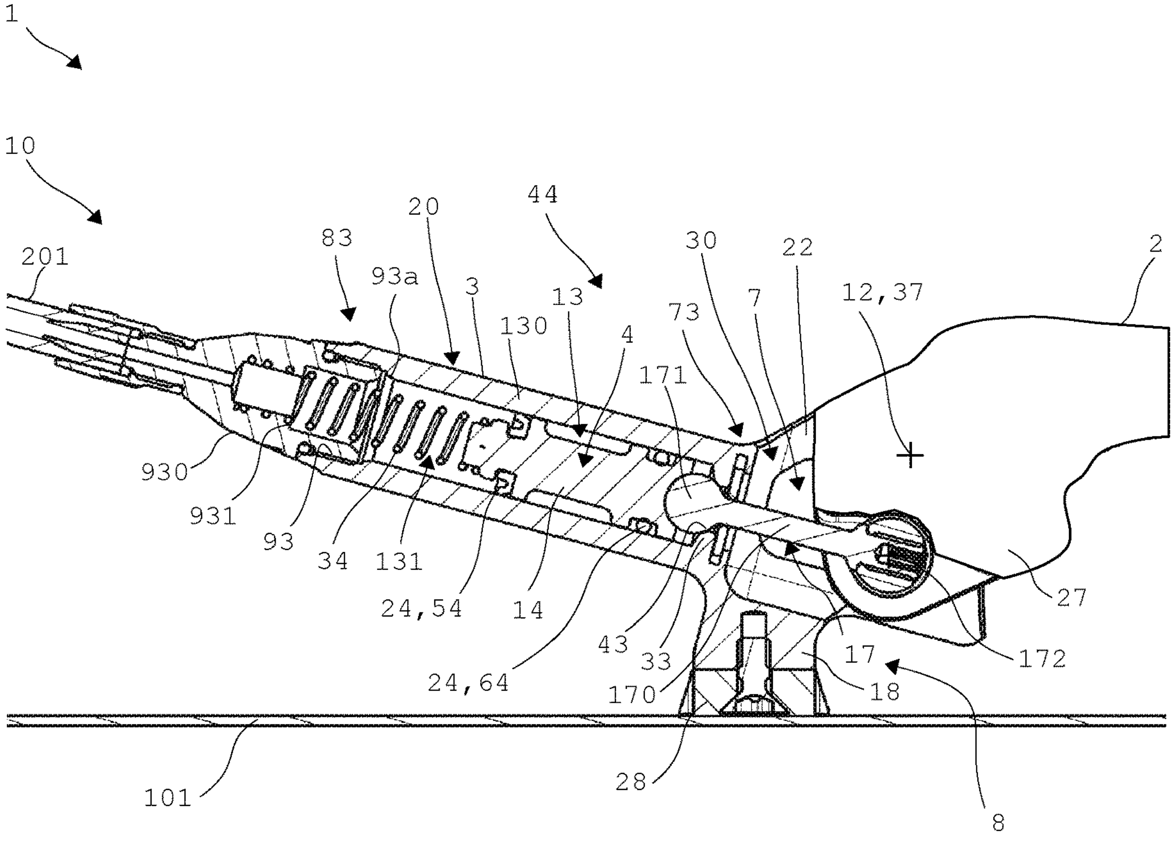
FIG. 4 the brake arrangement in an enlarged, sectional top view.
Figure 5:
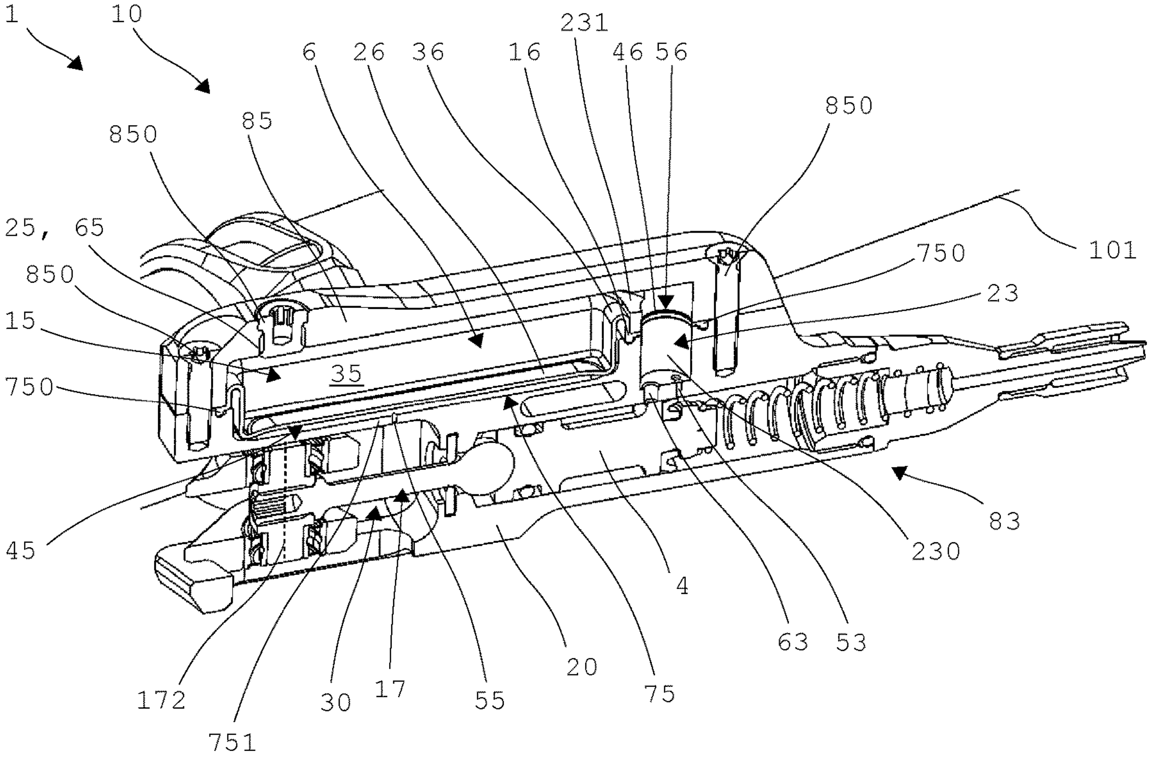
FIG. 5 the brake arrangement in a perspective side section view in the longitudinal direction, obliquely from above.

The FIGS. 1 and 2 illustrate bicycles 100 configured as a mountain bike respectively racing bicycle, each being equipped with a hydraulic brake arrangement 1 according to the application. The bicycles 100 are each provided with a front wheel 102 and a rear wheel 103, provided to be braked separately by means of separate hydraulic circuits 11. To this end, the hydraulic circuits 11 each comprise a transmitting unit 10 and a receiving unit 200.

A bicycle 100 comprises a frame 104, a handlebar 101 with grips 114, a saddle 107, a fork or suspension fork 105 and in the case of the mountain bike, a rear wheel damper 106 may be provided. A pedal crank 112 with pedals used for propelling the bicycle. Optionally, the pedal crank 112 and/or the wheels 102, 103 may be provided with an electrical auxiliary drive. The hubs of the wheels 102, 103 may each be attached to the frame 104 or the fork 105 by means of a clamping system 113 (for example a through axle or a quick release). The frame 104 and the fork 105 each have a receiving unit 200 fastened thereto, presently configured as hydraulic disk brakes. The receiving unit 200 is connected with the associated transmitting unit 10 by means of a conduction device 201, not visible, such that a closed hydraulic circuit 11 results. The transmitting units 10 of a bicycle 100 are mounted to opposite ends of the handlebar 101, each showing a brake lever 2 provided for finger actuation. In the racing bicycle 100, the transmitting unit 10 is configured as a shifting-braking combination.

The brake arrangement 1 according to the application will now be described in detail with reference to the various illustrations of the FIGS. 3 to 11.

The brake arrangement 1 comprises a transmitting unit 10, which is connected via a conduction device 201 with a receiving unit 200, not shown, for example a disk brake. The transmitting unit 10 is fastened to the handlebar 101 of a bicycle 100, presently by means of a handlebar link 8, as has been described above.

This handlebar link 8 comprises two linking sections 18, 28. The first linking section 18 is an integral component of a base body 20. The second linking section 28 is screwed to the first linking section 18 and comprises two parts which are pivotally coupled to one another through a hinge.

The transmitting unit 10 comprises a cylinder housing 3 with a cylinder space 13 and a piston unit 4 displaceably received in the cylinder space 13. The cylinder housing 3 is also an integral component of the base body 20.

A brake lever 2, likewise integrated in the base body 20, is supported on a lever accommodation 22 so that said lever can pivot around a brake lever pivot axis 12. The brake lever 2 is coupled to the piston unit 4 by means of an actuating mechanism 7. Pulling the brake lever 2 causes displacement of the piston unit 4 in the cylinder space 13.

The actuating mechanism 7 comprises a connecting rod device 17 with a connecting rod 170 and a connecting rod small end 171, and a cam body 27. The cam body 27 is supported on the lever accommodation 22, such that it can pivot around a cam pivot axis 37. The brake lever pivot axis 12 and the cam pivot axis 37 are presently identical. The connecting rod device 17 is linked to the cam body 27 for pivoting around a connecting rod pivot axis 172. The cam body 27 is accommodated in a receiving space 30 of the base body 20. The cam body 27 is configured integrally with the brake lever 2.

The cylinder housing 3 comprises a lever-side end 73 and a receiver-side end 83. The receiving space 30 lies on a longitudinal axis shared with the cylinder space 13. On the receiver-side end 83, a connection port 93 is configured for coupling the conduction device 201. On the lever-side end 73, a connecting opening 43 is configured, through which the connecting rod 170 extends from the receiving space 30 into the cylinder space 13 to the piston unit 4. The connecting opening 43 is configured in a supporting wall 33, which is integrally connected with the cylinder housing 3.

The piston unit 4 comprises a piston 14 and a piston sealing device 24, which is provided by a primary sealing 54 and a secondary sealing 64. The piston unit 4 is shown in a rest position 44, since the transmitting unit 10 is not actuated. In the rest position 44, the connecting rod small end 171 bears against a contact portion 330 of the supporting wall 33 (see FIG. 11). Here, the piston unit 4 rests against the connecting rod small end 171 with its lever-side end.

A biasing member 34, configured as a spring, rests against the opposite end of the piston unit 4. The biasing member 34 is supported on a support structure 931 of a connecting unit 930. The connecting unit 930 is screwed into the receiver-side end 83 of the cylinder housing 3, such that the hydraulic fluid can only exit from the cylinder space 13 through the connecting unit 930 and the linked conduction device 201. Between the connecting unit 930 and the cylinder housing 3, a sealing 932 is disposed such that the screw thread is not necessarily required for sealing.

For storing hydraulic fluid, an equalizing reservoir device 5 with a tank space 15 is provided. The hydraulic fluid provided is presently a biologically decomposable oil. Alternately, mineral oil or brake fluid (DOT) may be provided. The equalizing reservoir device 5 comprises a tank trough 75 and a cover 85. The tank trough 75 is an integral component of the base body 20.

In the cover 85, a filling mouth 25 is provided, which doubles as a deaeration opening 65 for deaerating the hydraulic circuit 11 in the scope of maintenance work. The cover 85 of the equalizing reservoir device 5 is fastened to the tank trough 75 with two screws 850. For closing the filling mouth 25 or the deaeration opening 65, another screw 850 is provided.

In the tank space 15, a membrane unit 6 is disposed, subdividing the tank space 15 into a fluid space 35 for the hydraulic fluid and an air space 45. The membrane unit 6 seals the fluid space 35 from the air space 45.

The piston unit 4 and the cylinder housing 3 shown, limit a pressure space 131, which forms part of the cylinder space 13. The pressure space 131 is connected with the fluid space 35 through an equalizing hole 53 configured in a cylinder wall 130 of the cylinder housing 3. Merely exemplarily, the equalizing hole 53 consists of a total of three single holes. In the sectional view of the FIG. 5, the sectional plane extends through the central hole of the three holes.

The equalizing hole 53 is exposed when the piston unit 4 is in the rest position 44. When the transmitting unit 10 is actuated, the piston unit 4 seals the pressure space 131 against the fluid space 35 with its primary sealing 54. This applies pressure on the pressure space 131, when the brake lever 2 continues to be pulled. Then, the receiving unit 200 is actuated, and for example a piston of a disk brake is extended.

In addition to the equalizing hole 53, the cylinder space 13 is connected with the fluid space 35 through a lubrication hole 63. The lubrication hole 63 opens into a part of the cylinder space 13 lying outside of the pressure space 131. Through the lubrication hole 63, hydraulic fluid can flow behind the primary sealing 54, where it lubricates the piston unit 4. Moreover, the hydraulic fluid can return into the tank space 15 through the lubrication hole 63, when it has flowed behind the primary sealing 54. The lubrication hole 63 is sealed by means of the secondary sealing 64 against the connecting opening 43 and the receiving space 30 located behind.

The equalizing hole 53 and the lubrication hole 63 are parts of a duct connection 23 which connects the fluid space 35 with the cylinder space 13. The equalizing hole 53 and the lubrication hole 63 extend from a central duct 230 of the duct connection 230 into the cylinder space 15. The central duct 230 is connected with the fluid space 35 through a transverse duct 231 configured in the cover 85. The central duct 230 and the equalizing hole 53 and the lubrication hole 63 are configured in the base body 20.

The air space 45 is connected with atmosphere through a vent opening (and, in particular, e.g. a vent hole) 55. Thus, pressure changes are equalized, when the quantity of hydraulic fluid in the fluid space 35 increases or decreases, thus causing the membrane unit 6 to bulge upwardly respectively downwardly. The vent opening 55 shown is configured in the bottom 751 of the tank trough 75 and opens into the receiving space 30. Thus, the vent opening 55 is enclosed by the base body 20 in the region of its mouth and accommodated well protected in the receiving space 30.

In the transmitting unit 120 shown, an imaginary elongation of the longitudinal axis of the vent opening 55 intersects the connecting rod 170. Moreover, the connecting rod pivot axis 172 and the vent opening 55 extend in parallel to one another. The brake lever pivot axis 12 extends in parallel to the longitudinal axis of the vent opening 55. Moreover, the vent opening 55, the central of the three equalizing holes 53 and the lubrication hole 63 and the central duct 230, show longitudinal axes extending in parallel to one another. The equalizing reservoir device 5 and the cylinder space 13 show longitudinal axes extending in parallel to one another.

The membrane unit 6 is configured integrally, and comprises a tank sealing 16 and a membrane component 26 and a connection member 36, and a duct sealing 46. The membrane unit 6 is particularly clearly visible in the detail illustration of FIG. 9.

In a mounted state as intended, the tank sealing 16 extends between the tank trough 75 and the cover 85, such that these are mounted sealed to one another. The membrane component 26 is enclosed by the tank sealing 16 and is spread between the fluid space 35 and the air space 45.

The connection member 36 is configured arcuate and connects the membrane component 26 with the tank sealing 16. The connection member 36 biases the membrane component 26 in the region of a circumferential bottom edge against the bottom 751 of the tank trough 75 (see FIG. 8). In the region of the vent opening 55, the membrane component 26 is configured bulged, such that it is disposed spaced apart from the bottom 751.

The tank sealing 16 is accommodated in a receiving groove 750 of the tank trough 75. Since the tank trough 75 and the cover 85 are spaced apart in the region of the receiving groove 750, the tank sealing 16 cannot shear off even in the case of shocks acting on the cover 85. In the region of the duct sealing 46, the tank sealing 16 extends between the duct sealing 46 and the membrane component 26. Moreover, the base body 20 likewise has a receiving groove 750 in the region of the duct sealing 46 to prevent the duct sealing 46 from shearing off.

The duct sealing 46 seals the duct connection 23 against the cover 85 and the base body 20. Since the duct connection 23 shown, extends from the fluid space 35 through the cover 85 and further through the base body 20 to the cylinder space 13, the hydraulic fluid does not need to flow through the membrane component 26. The hydraulic fluid may pass the membrane unit 6 outside of the tank sealing 16.

To this end, the hydraulic fluid passes the membrane unit 6 through a through hole 56 configured in the duct sealing 46. This omits a passage in the membrane component 26, the sealing of which tends to be very complicated. Nevertheless, no additional sealing needs to be mounted, since the membrane unit 6 also provides for the duct sealing 46.

The air space 45 is configured beneath the fluid space 35. The filling mouth 25 opens directly into the fluid space 35, such that the membrane unit 6 does not need to be removed for filling up the hydraulic fluid. Since the filling mouth 25 is also configured as a deaeration opening 65, the membrane unit 6 is not required to be demounted for deaerating either.

Figure 7:
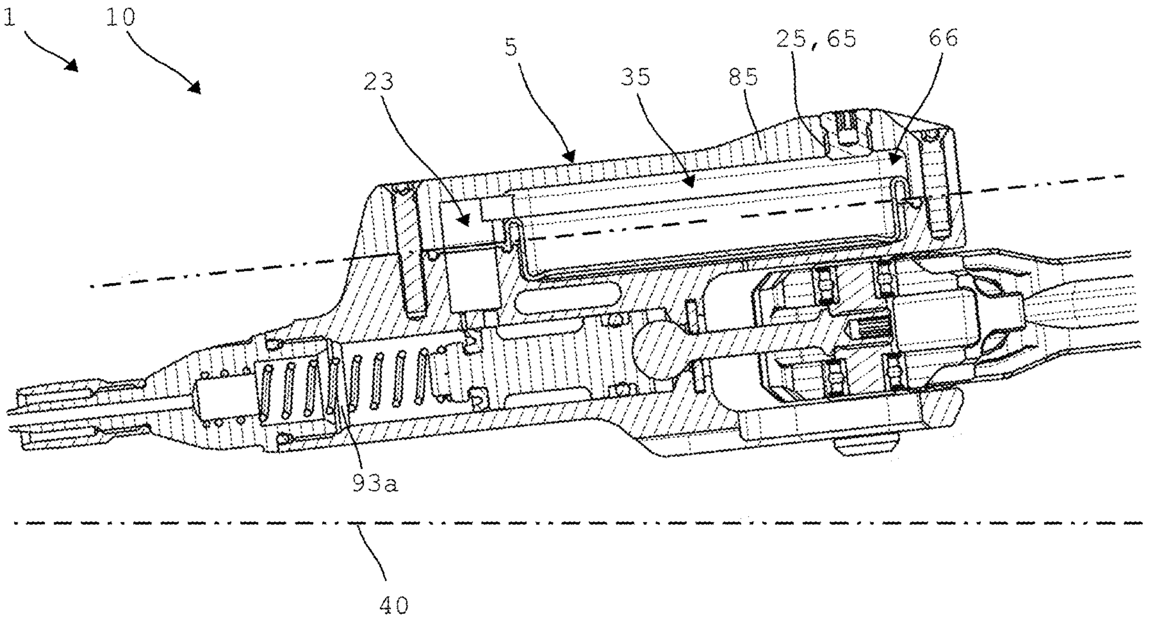
FIG. 7 the brake arrangement in a side section view in a mounted position as intended.
Figure 8:
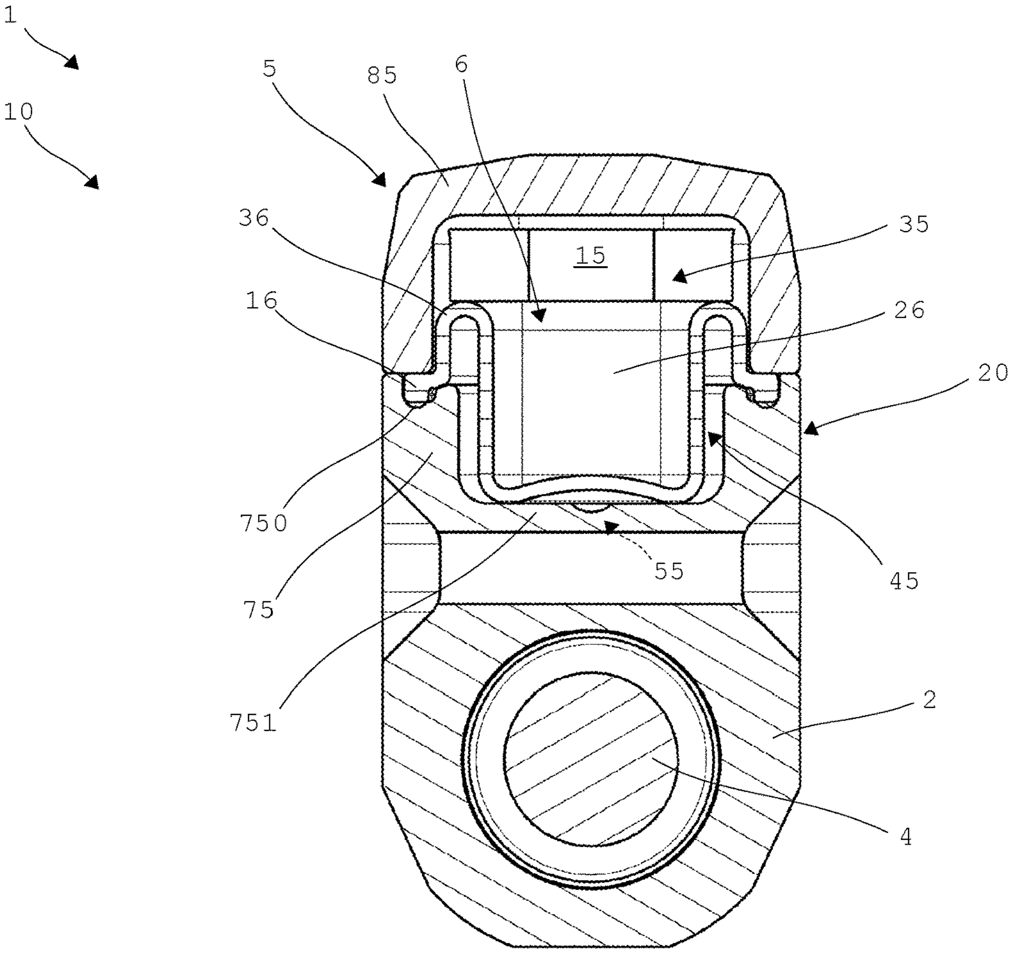
FIG. 8 a detail illustration of the brake arrangement sectioned transverse to the longitudinal direction in the region of the equalizing reservoir device.
Figure 9:
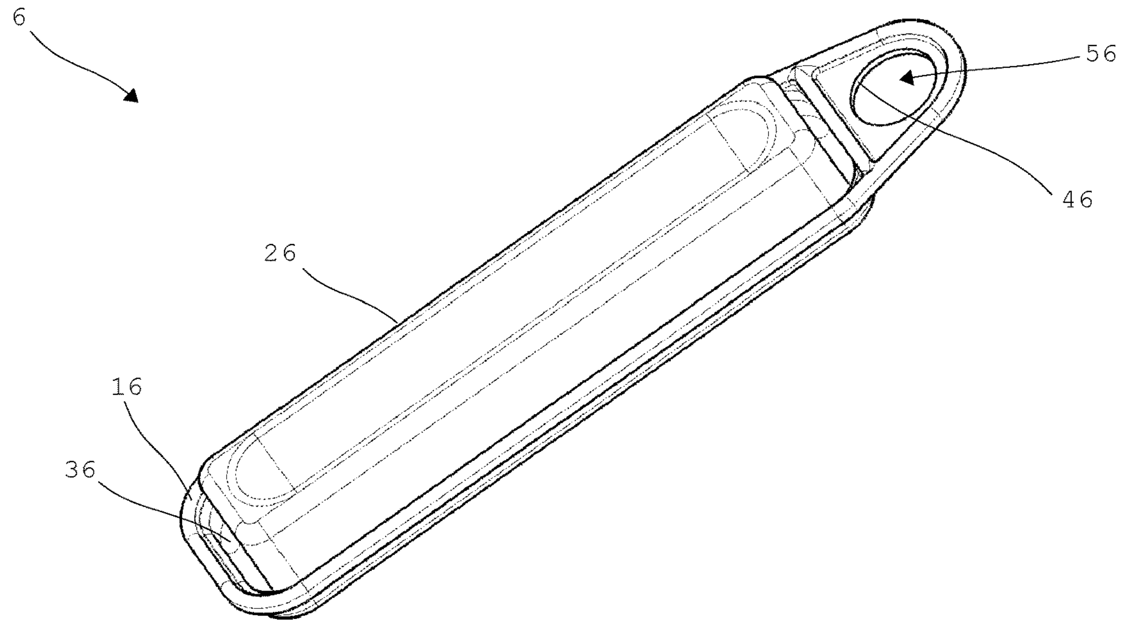
FIG. 9 a detail illustration of the membrane unit of the brake arrangement in a perspective view.

As can be clearly seen in the FIG. 7, the equalizing reservoir device (respectively the entire transmitting unit 10) has a longitudinal axis (drawn in a dash-dotted line in the FIG. 7) inclined to the horizontal 40 when the transmitting unit 10 is mounted to the handlebar 101 of the bicycle 100 as intended. Thus, the end portion of the equalizing reservoir device 5, on which the filling mouth 25 and the deaeration opening 65 are disposed, is positioned higher than the opposite end portion. Thus, the hydraulic fluid collects in the region of the duct connection 23, while any air possibly present in the fluid space 35 collects in the end portion 66 with the filling mouth 25 respectively the deaeration opening 65. The duct connection 23 and the filling mouth 25 are disposed on end portions of the equalizing reservoir device 5 opposite each other in the longitudinal direction.

When manufacturing the brake arrangement 1 shown, the base body 20 is manufactured by selective material removal from a base body blank. This generates the base body 20 shown, in which the cylinder housing 3 with the cylinder space 13 and the supporting wall 33 and the contact portion 330, the lever accommodation 22 and the tank trough 75 of the equalizing reservoir device 5, and the receiving space 30 and the pertaining holes or ducts are fixedly incorporated.

After working out the cylinder space 13, the supporting wall 33 is readily accessible to tools, from the connection port 93. Thus, the contact surface 330 can be processed uncomplicated while highly precisely, working from the connection port 93. Before or after, the connecting opening 43 can also be manufactured through the connection port 93 or working from the receiving space 30. The equalizing hole 53 may be manufactured before or after manufacturing the contact portion 330.

Figure 6:
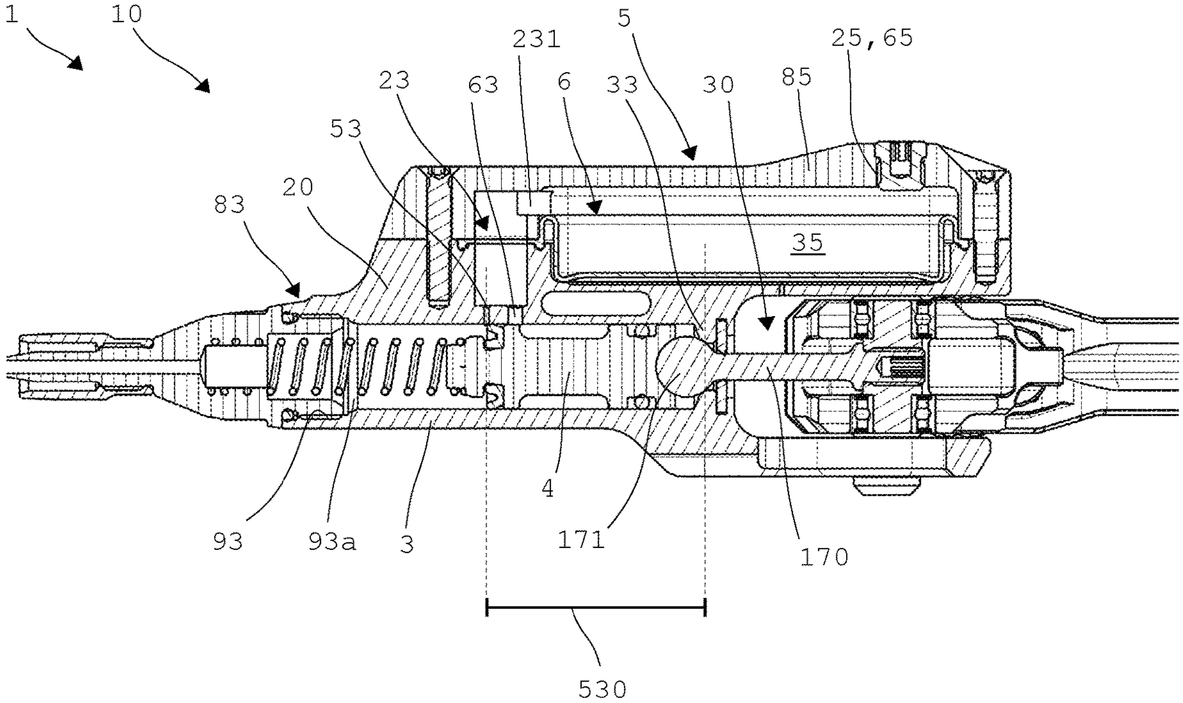
FIG. 6 the brake arrangement in a side section view.

In any case, the equalizing hole 53 and the contact portion 330 are incorporated in the base body 20 at defined distances 530 from one another (see FIG. 6). In the case that the cover 85 is not mounted yet, the equalizing hole 53 can be positioned in the base body 20 very uncomplicated and with high precision, such that the distance 530 observe particularly narrow tolerances. When the dimensions of the piston unit 4 and the connecting rod 17 are given, the dead travel is defined via the distance 530. Since the invention precisely observes the distance 530, the dead travel is also specified with particularly narrow tolerances.

After finishing the cylinder space 13, the piston unit 4 in the preassembled state (the piston 14 with the piston sealing device 24 mounted) is inserted into the cylinder space 13 through the connection port 93. The minimum diameter of the connection port 93 is matched to the maximum diameter of the cross sectional geometry of the piston unit 4. To protect the piston sealing device 24 when pushing in, the connection port 93 shown is provided with a chamfer 93*a*.

Firstly, the connecting rod device 17 is inserted into the cylinder space 13 through the connection port 93, with the connecting rod 170 leading. The connecting rod 171 is guided back out from the cylinder space 13 through the connecting opening 43, and connected with the cam body 27 in the receiving space 30.

On a side of the connecting opening 43 facing away from the cylinder space 13, a sealing groove 174 is incorporated into the base body 20. A sealing member 173 is inserted into the sealing groove 174, through which the connecting rod 170 extends. In this way, the cylinder space 13 is sealed from the receiving space 30.

Figure 10:
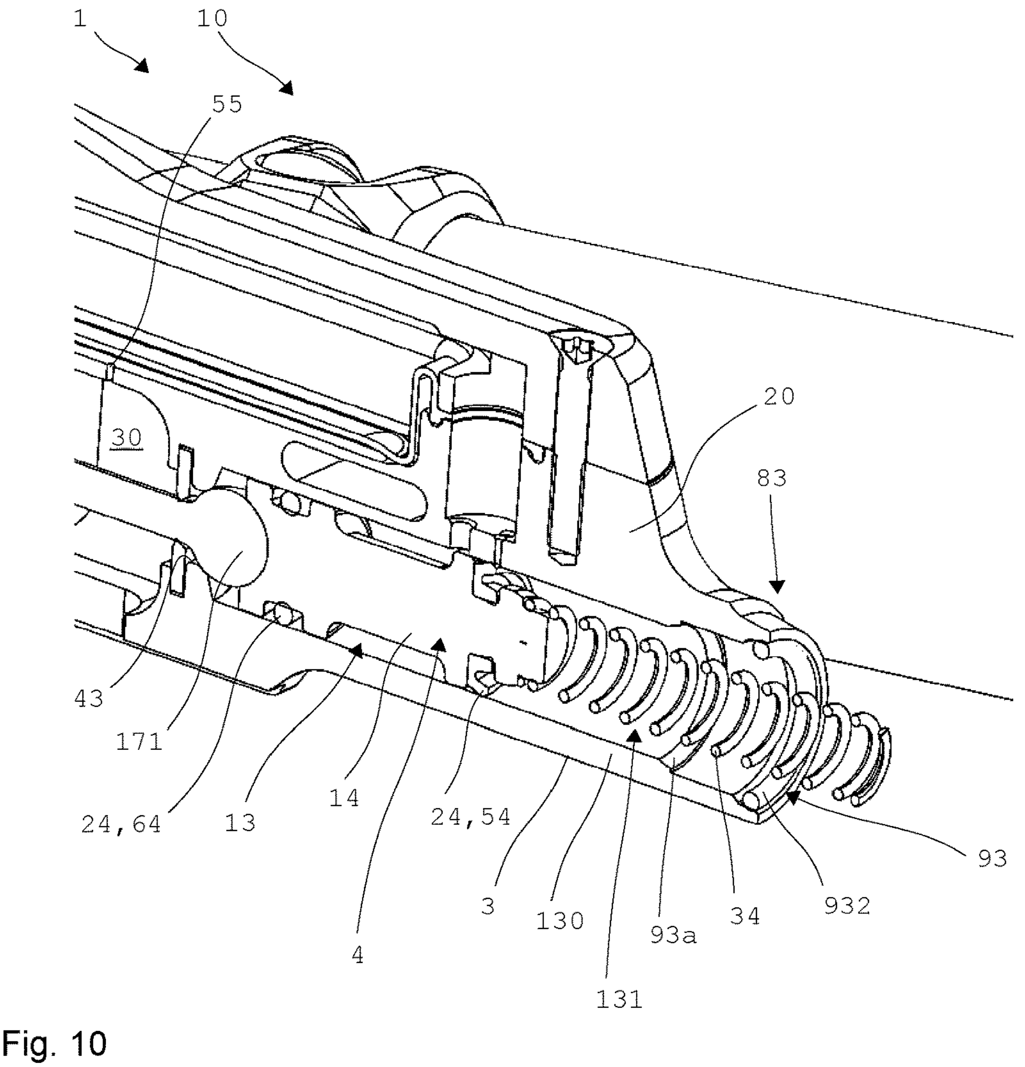
FIG. 10 a detail illustration of the brake arrangement in a sectioned, perspective side view, obliquely from the front.
Figure 11:
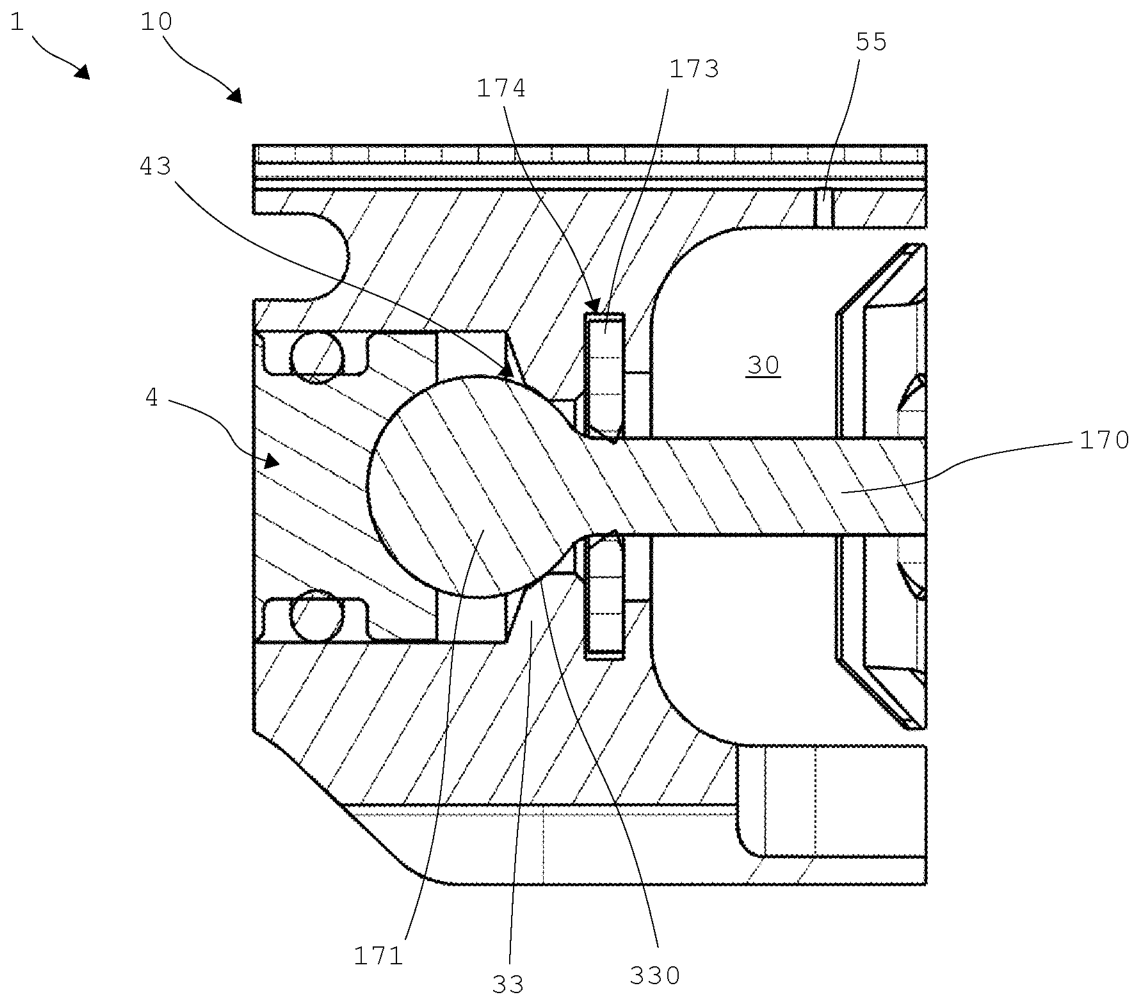
FIG. 11 an illustration of an enlarged detail of the FIG. 6.

After inserting the piston unit 4 in the cylinder space 13, the biasing member 34 is inserted through the connection port 93 (see FIG. 10). Thereafter, the connecting unit 930 is screwed in, so as to compress the biasing member 34. The biasing member 34 causes the piston unit 4 to be biased in the rest position 44 such that the connecting rod small end 171 is urged against the contact portion 330 of the supporting wall 33.

The transmitting unit 10 shown, due to its special structural assembly, allows exchanging the piston sealing device 24 respectively the piston 14 within a very short time, for practiced persons for example in less than one minute. To gain access to the piston unit 4, only the connecting unit 930 needs to be unscrewed. Since the piston unit 4 bears only loosely (biased) against the connecting rod device 17, the piston unit 4 can be pulled out of the cylinder space 13 quite simply through the connection port 93. After mounting for example a new primary sealing 54, the piston unit 4 can, again quite simply, be reinserted in the cylinder space 13.

After inserting the biasing member 34 and screw-fixing the connecting unit 930, the transmitting unit 10 is then completely installed again. Due to the distance 530 fixedly incorporated in the base body 20 and the supporting wall 33 with its contact portion 330 configured integrally in the base body 20, the dead travel is then automatically adjusted optimally. Subsequent filling up and deaerating the hydraulic circuit 11 can be done very simply and safely, due to the equalizing reservoir device 5 and the membrane unit 6 described above.

While a particular embodiment of the present hydraulic brake arrangement for an at least partially muscle-powered bicycle have been described herein, it will be appreciated by those skilled in the art that changes and modifications may be made thereto without departing from the invention in its broader aspects and as set forth in the following claims.

LIST OF REFERENCE NUMERALS

1 brake arrangement
2 brake lever
3 cylinder housing
4 piston unit
5 equalizing reservoir device
6 membrane unit
7 actuating mechanism
8 handlebar link
10 transmitting unit
11 hydraulic circuit
12 brake lever pivot axis
13 cylinder space
14 piston
15 tank space
16 tank sealing
17 connecting rod device
18 linking section
20 base body
22 lever accommodation
23 duct connection
24 piston sealing device
25 filling mouth
26 membrane component
27 cam body
28 linking section
30 receiving space
33 supporting wall
34 biasing member
35 fluid space
36 connecting member
37 cam pivot axis
40 horizontal
43 connecting opening
44 rest position
45 air space
46 duct sealing
53 equalizing hole
54 primary sealing
55 vent opening
56 through hole
63 lubrication hole
64 secondary sealing
65 deaeration opening
73 end
75 tank trough
83 end
85 cover
93 connection port
93*a* chamfer
100 bicycle
101 handlebar
102 wheel, front wheel
103 wheel, rear wheel
104 frame
105 fork, suspension fork
106 rear wheel damper
107 saddle
109 spoke
110 rim
112 pedal crank
113 clamping system
114 grip
130 cylinder wall
131 pressure space
170 connecting rod
171 connecting rod small end
172 connecting rod pivot axis
173 sealing member
174 sealing groove
200 receiving unit
201 conduction device
230 central duct
231 transverse duct
330 contact portion
530 distance
750 receiving groove
751 bottom
850 screw
930 connecting unit
931 support structure
932 seal

The invention claimed is:

1. A hydraulic brake arrangement for an at least partially muscle-powered bicycle, comprising:

at least one transmitting unit provided for fluid connection with a receiving unit;

wherein the transmitting unit comprises a brake lever and a cylinder housing with a cylinder space, and a piston unit displaceably received in the cylinder space, and at least one equalizing reservoir device for a hydraulic fluid;

wherein the at least one equalizing reservoir device comprises a tank space and at least one filling mouth for filling in the hydraulic fluid; and wherein at least one membrane unit is disposed in the tank space, subdividing the tank space into a fluid space for the hydraulic fluid and an air space sealed against the fluid space;

wherein at least one duct connection is configured between the fluid space and the cylinder space;

wherein the duct connection extends from the fluid space through at least one cover of the equalizing reservoir device and through the base body to the cylinder space;

wherein the cover and the base body are circumferentially mounted to one another around the duct connection, sealed by means of a duct sealing;

wherein the duct sealing is an integral component of the membrane unit;

wherein the air space is connected with atmosphere through at least one vent opening, so as to enable pressure compensation between the air space and atmosphere; and wherein, when the membrane unit is mounted, the filling mouth is in fluid connection with the fluid space;

wherein the equalizing reservoir device comprises at least one tank trough and the at least one cover, and wherein the tank trough and the cover are mounted to one another; and wherein the at least one vent opening is configured in the bottom in the tank trough, and wherein the filling mouth is configured in the cover.

2. The brake arrangement according to claim 1, wherein a base body is configured integrally, and wherein the cylinder housing is an integral component of the base body, and wherein the vent opening extends in the base body.

3. The brake arrangement according to claim 1, wherein an imaginary elongation of a longitudinal axis of the vent opening intersects a connecting rod device of an actuating mechanism.

4. The brake arrangement according to claim 1, wherein a cam body is at least partially accommodated in a receiving space, wherein a connecting rod device is pivotally linked to the cam body, and wherein the vent opening opens into the receiving space between the cam body and a supporting wall, wherein in the supporting wall, a connecting opening is configured, through which an actuating mechanism extends from the receiving space into the cylinder space to the piston unit.

5. The brake arrangement according to claim 4, wherein the connecting rod device is linked to the cam body for pivoting around a connecting rod pivot axis, and wherein the connecting rod pivot axis and the longitudinal axis of the vent opening extend in one shared plane.

6. The brake arrangement according to claim 1, wherein the brake lever is linked to a lever accommodation for pivoting around a brake lever pivot axis, and wherein the vent opening has a longitudinal axis which lies in one plane with the brake lever pivot axis.

7. The brake arrangement according to claim 6, wherein the brake lever pivot axis extends through a receiving space.

8. The brake arrangement according to claim 1, wherein the vent opening and the duct connection have longitudinal axes extending in a shared plane.

9. The brake arrangement according to claim 1, wherein an imaginary axial elongation of the cylinder space extends through a receiving space.

10. The brake arrangement according to claim 1, wherein the equalizing reservoir device is disposed above the cylinder space and a receiving space, and wherein the equalizing reservoir device and the cylinder space and/or the receiving space have longitudinal axes which extend in a shared plane.

11. The brake arrangement according to claim 1, wherein the filling mouth is also configured as a deaeration opening for deaerating a hydraulic circuit, and wherein deaeration is possible when the membrane unit is mounted as intended.

12. The brake arrangement according to claim 1, wherein the air space is disposed beneath the membrane unit, and the fluid space, above the membrane unit, and a receiving space, beneath the air space and the fluid space, when the transmitting unit is mounted to the handlebar as intended.

13. The brake arrangement according to claim 1, wherein the equalizing reservoir device has a longitudinal axis which is inclined to the horizontal, such that the equalizing reservoir device has at least one collecting area for air, which is higher than at least two-thirds of the reservoir space not including the collecting areas of the equalizing reservoir device, when the transmitting unit is mounted to the handlebar as intended, and wherein the filling mouth is disposed in the collecting area of the equalizing reservoir device.

14. The brake arrangement according to claim 1, wherein the duct connection and the filling mouth are disposed on end portions of the equalizing reservoir device opposite each other in the longitudinal direction.

15. The brake arrangement according to claim 1, wherein the at least one vent opening and the filling mouth have longitudinal axes extending in a shared plane.

16. The brake arrangement according to claim 1, wherein the tank trough and/or the cover provide at least one receiving groove for a tank sealing, and wherein the tank trough and the cover are spaced apart in the region of the receiving groove in the mounted state as intended, such that the tank sealing is accommodated shear-proof.

17. The brake arrangement according to claim 1, wherein the membrane unit comprises a membrane component provided for spreading between the fluid space and the air space, and wherein the membrane component is an integral component of the membrane unit, and wherein the membrane unit comprises at least one arcuate connection member, and wherein the connection member biases the membrane component at least in sections against the bottom of the equalizing reservoir device.

18. The brake arrangement according to claim 17, wherein the membrane component is configured bulged above the vent opening, such that the membrane component at least in this place is disposed spaced apart from the bottom of the equalizing reservoir device.

19. The brake arrangement according to claim 1, wherein the duct sealing encircles the duct connection in a ring shape, extending in sections between the cover and a tank trough of the equalizing reservoir device.

20. The brake arrangement according to claim 1, wherein a tank sealing encircles the membrane component in a ring shape, and wherein the duct sealing is disposed outside of the membrane component and is not encircled by the tank sealing in a ring shape.

21. The brake arrangement according to claim 1, wherein the hydraulic fluid must pass the membrane unit to get to the cylinder space, and wherein to this end, the hydraulic fluid passes the membrane unit through a through hole enclosed by the duct sealing.

22. The brake arrangement according to claim 1, wherein the membrane unit is configured integrally.

23. The brake arrangement according to claim 1, wherein the duct connection has a longitudinal axis extending transverse to a shared longitudinal axis of the equalizing reservoir device and the cylinder space and a receiving space.

24. The brake arrangement according to claim 1, wherein the duct connection comprises a central duct, which is subdivided into at least one equalizing hole and at least one lubrication hole, and wherein the central duct and at least one of the at least one equalizing holes and at least one of the at least one lubrication holes comprise longitudinal axes extending in a shared plane.

25. A hydraulic brake arrangement for an at least partially muscle-powered bicycle, comprising:

at least one transmitting unit provided for fluid connection with a receiving unit;

wherein the transmitting unit comprises a brake lever and a cylinder housing with a cylinder space, and a piston unit displaceably received in the cylinder space, and at least one equalizing reservoir device for a hydraulic fluid;

wherein the at least one equalizing reservoir device comprises a tank space and at least one filling mouth for filling in the hydraulic fluid; and wherein at least one membrane unit is disposed in the tank space, subdividing the tank space into a fluid space for the hydraulic fluid and an air space sealed against the fluid space;

wherein at least one duct connection is configured between the fluid space and the cylinder space;

wherein the air space is connected with atmosphere through at least one vent opening, so as to enable pressure compensation between the air space and atmosphere; and wherein, when the membrane unit is mounted, the filling mouth is in fluid connection with the fluid space;

the vent opening opens into a receiving space that is at least partially encircled by the base body of the transmitting unit;

an actuating mechanism is at least partially disposed in the receiving space and forces transmission from the brake lever to the piston unit;

wherein the equalizing reservoir device comprises at least one tank trough and at least one cover, and wherein the tank trough and the cover are mounted to one another; and wherein the at least one vent opening is configured in the bottom in the tank trough, and wherein the filling mouth is configured in the cover.

26. A hydraulic brake arrangement for an at least partially muscle-powered bicycle, comprising:

at least one transmitting unit provided for fluid connection with the receiving unit;

wherein the transmitting unit comprises a brake lever and a cylinder housing with a cylinder space, and a piston unit displaceably received in the cylinder space, and at least one equalizing reservoir device for a hydraulic fluid;

wherein the at least one equalizing reservoir device comprises a tank space and at least one filling mouth for filling in the hydraulic fluid; and wherein at least one membrane unit is disposed in the tank space, subdividing the tank space into a fluid space for the hydraulic fluid and an air space sealed against the fluid space;

wherein at least one duct connection is configured between the fluid space and the cylinder space;

wherein the air space is connected with atmosphere through at least one vent opening, so as to enable pressure compensation between the air space and atmosphere;

wherein, when the membrane unit is mounted, the filling mouth is in fluid connection with the fluid space;

the vent opening opens into a receiving space that is at least partially encircled by the base body of the transmitting unit;

an actuating mechanism is at least partially disposed in the receiving space and forces transmission from the brake lever to the piston unit;

wherein the membrane unit comprises a membrane component provided for spreading between the fluid space and the air space;

wherein the membrane component is an integral component of the membrane unit;

wherein the membrane unit comprises at least one arcuate connection member; and wherein the connection member biases the membrane component at least in sections against the bottom of the equalizing reservoir device.

* * * * *